United States Patent
Malveaux et al.

(10) Patent No.: US 11,252,178 B1
(45) Date of Patent: Feb. 15, 2022

(54) SYSTEM AND METHOD FOR AUTOMATING SECURITY CONFIGURATION STANDARDS ASSESSMENTS AND MITIGATIONS

(71) Applicant: Metis Technology Solutions, Inc., Albuquerque, NM (US)

(72) Inventors: Chloe Malveaux, Albuquerque, NM (US); Julie Christenson, Albuquerque, NM (US)

(73) Assignee: METIS TECHNOLOGY SOLUTIONS, INC., Albuquerque, NM (US)

( * ) Notice: Subject to any disclaimer, the term of this patent is extended or adjusted under 35 U.S.C. 154(b) by 13 days.

(21) Appl. No.: 16/937,391

(22) Filed: Jul. 23, 2020

Related U.S. Application Data

(60) Provisional application No. 62/916,086, filed on Oct. 16, 2019.

(51) Int. Cl.
*H04L 29/06* (2006.01)

(52) U.S. Cl.
CPC ........ *H04L 63/1433* (2013.01); *H04L 63/105* (2013.01); *H04L 63/20* (2013.01)

(58) Field of Classification Search
CPC .... H04L 63/1433; H04L 63/105; H04L 63/20
USPC ........................................................ 726/25
See application file for complete search history.

(56) References Cited

U.S. PATENT DOCUMENTS

| | | | |
|---|---|---|---|
| 6,941,285 B2 * | 9/2005 | Sarcanin | G06Q 20/105 705/67 |
| 8,412,945 B2 | 4/2013 | Sweet et al. | |
| 8,490,188 B2 | 7/2013 | Kandek et al. | |
| 8,819,832 B2 | 8/2014 | Li et al. | |
| 8,875,296 B2 | 10/2014 | Moore | |
| 8,914,841 B2 | 12/2014 | Harrison | |
| 8,990,559 B2 | 3/2015 | Hajost et al. | |
| 9,203,808 B2 | 12/2015 | Harrison et al. | |
| 9,264,444 B2 | 2/2016 | Moore et al. | |

(Continued)

*Primary Examiner* — Kambiz Zand
*Assistant Examiner* — Aubrey H Wyszynski
(74) *Attorney, Agent, or Firm* — Peacock Law P.C.; Janeen Vilven

(57) ABSTRACT

A system and method for determining a point in time compliance status of a computing system with a security guideline standard (SGS) wherein the computing system has a command line shell available through a native operating system, the method comprising inputting into a host computer of the computing system a SGS package that represents a scripted SGS that is a non-text file and is encrypted that provides instructions for an evaluation of a computing system's compliance with the SGS under consideration wherein the SGS package performs at least a portion of an automated evaluation of a compliance status at the point in time of the computing system under consideration when the SGS package is decrypted by the computing system; sending a command query from the decrypted SGS package to the selected device of the computer system; compiling in a locally hosted database of the host computer compliance results sent from the selected device of the computing system in response to the command query from the decrypted SGS package that is applicable for the selected device; and generating a report for the compliance results of the selected device with the SGS package that is applicable.

20 Claims, 13 Drawing Sheets

(56) References Cited

U.S. PATENT DOCUMENTS

| | | |
|---|---|---|
| 9,306,806 B1 | 4/2016 | Zhang et al. |
| 9,386,048 B2 | 7/2016 | Harrison et al. |
| 9,411,965 B2 | 8/2016 | Giakouminakis et al. |
| 9,537,749 B2 | 1/2017 | Barkan et al. |
| 9,742,639 B1 | 8/2017 | Zhang et al. |
| 10,043,011 B2 | 8/2018 | Adbine et al. |
| 10,116,704 B2 | 10/2018 | Lang et al. |
| 10,229,274 B2 | 3/2019 | Kandek et al. |
| 10,341,303 B2 | 7/2019 | Hajost et al. |
| 10,360,408 B1 | 7/2019 | Kincaid et al. |
| 10,367,834 B2 | 7/2019 | Sweet et al. |
| 10,546,134 B2 | 1/2020 | Abdine et al. |
| 11,075,935 B2 * | 7/2021 | Nides .................. H04L 63/1425 |
| 2006/0248591 A1 | 11/2006 | Day et al. |
| 2012/0066286 A1 * | 3/2012 | Heredia .............. H04L 12/2814 |
| | | 709/201 |
| 2015/0170158 A1 * | 6/2015 | Monkiewicz ........ G06Q 30/018 |
| | | 705/35 |
| 2017/0099144 A1 * | 4/2017 | Sobel ................... H04L 63/083 |

* cited by examiner

801

Username

TESTGROUPI.com\Administrator

Password

Enter

Cancel

FIG. 9

| Name | Domain | IsDomainController | IsServer | IsVirtual | OperatingSystem | Arc |
|---|---|---|---|---|---|---|
| TESTGRP1DCO1 | TestGroup1.com | ☑ | ☑ | ☑ | Microsoft Windows Server 2016 Standard | 64- |
| TESTGRP1WSK01 | TestGroup1.com | ☐ | ☐ | ☑ | Microsoft Windows 10 Enterprise | 64- |
| TESTGRP1WSK02 | TestGroup1.com | ☐ | ☐ | ☑ | Microsoft Windows 10 Enterprise | 64- |
| TESTGRP1MS01 | TestGroup1.com | ☐ | ☑ | ☑ | Microsoft Windows Server 2016 Standard | 64- |

Welcome, Administrator

Devices — Inventory | Assessment

Domain Controller: TESTGRP1DCO1.TESTGROUP1.com ▾   Scan Domain
Computer:   Scan Computer

Computers | History

Dashboard
Configuration
Devices
Scripts

901

Welcome, Administrator

- Dashboard
- Configuration
- Devices
- Scripts

Devices

| Inventory | Assessment |

Domain Controller: TESTGRP1DC01.TESTGROUP1.com ▽  [Scan Domain]

Computer: [Scan Computer]

| Computers | History | TESTGRP1DC01.TESTGROUP1.com |

Name: TESTGRP1DC01.TESTGROUP1.com    Domain TestGroup1.com
Operating System: Microsoft Windows Server 2016 Standard
OS Version: 10.0.14393                Architecture: 64-bit
Memory Allocated: 8387556             Memory Free: 7030688

⊙ Processors

| Device ID | Name | Status | Description |
|---|---|---|---|
| Intel(R) Xeon(R) Gold 6132 CPU @ 2.60GHz | CPU0 | OK | Intel64 Family 6 Model 85 Stepping 4 |
| Intel(R) Xeon(R) Gold 6132 CPU @ 2.60GHz | CPU1 | OK | Intel64 Family 6 Model 85 Stepping 4 |
| Intel(R) Xeon(R) Gold 6132 CPU @ 2.60GHz | CPU2 | OK | Intel64 Family 6 Model 85 Stepping 4 |
| Intel(R) Xeon(R) Gold 6132 CPU @ 2.60GHz | CPU3 | OK | Intel64 Family 6 Model 85 Stepping 4 |

⊙ Hard Drives

| Name | Capacity | Free | IsBootable | IsSystemReserve |
|---|---|---|---|---|
| C: | 42355126272 | 31016525824 | ☑ | ☐ |
|  | 471855104 | 141619200 | ☐ | ☐ |

⊙ Network Adaptors

| Description | DHCPEnabled | DomainDNSRegistrationEnabled | DNSDomainSuffixSearchOrder |
|---|---|---|---|
| Intel(R) 82574L Gigabit Network Connection | ☐ | ☐ | TestGroup1.com |

Welcome, Administrator

Devices

| Inventory | Assessment |
|---|---|

Library: U_SRG-STIG_LIBRARY_2019_01 ▼
Benchmark: ▼
Reset | Run Assessment(s)

Dashboard
- Computers | History

Configuration
- Select Run: All Results ▼

Devices

Scripts

| Run Start | | | | | Run End | |
|---|---|---|---|---|---|---|
| Name | CheckId | Status | Type | Details | | |
| TESTGRP1WSK01 | 17308 | pass | genericCheckResult | ⊙ | | |
| TESTGRP1WSK01 | 17363 | notApplicable | genericCheckResult | ⊙ | | |
| TESTGRP1WSK01 | 17238 | pass | RegistrySettingCheckResult | ⊙ | | |
| TESTGRP1WSK01 | 17278 | fail | RegistrySettingCheckResult | Registry::HKLM\Software\microsoft\windows\currentVersion\policies\system, ConsentPro ⊙ | | |
| TESTGRP1WSK01 | 17313 | pass | genericCheckResult | ⊙ | | |
| TESTGRP1WSK02 | 17176 | fail | RegistrySettingCheckResult | Registry::HKLM\Software\Policies\Microsoft\Windows\EventLog\System, Maxsize, Does N ⊙ | | |
| TESTGRP1WSK02 | 17328 | fail | RegistrySettingCheck Result | Registry::HKLM\Software\Policies\Microsoft\Windows\CloudContent, DisableWindowsCon ⊙ | | |
| TESTGRP1WSK02 | 17338 | notApplicable | GenericCheckResult | ⊙ | | |
| TESTGRP1WSK02 | 17308 | pass | GenericCheckResult | ⊙ | | |
| TESTGRP1WSK02 | 17318 | fail | RegistrySettingCheckResult | ⊙ | | |
| TESTGRP1WSK02 | 17368 | notApplicable | GenericCheckResult | ⊙ | | |
| TESTGRP1WSK02 | 17378 | notApplicable | GenericCheckResult | ⊙ | | |

SYSTEM AND METHOD FOR AUTOMATING SECURITY CONFIGURATION STANDARDS ASSESSMENTS AND MITIGATIONS

CROSS-REFERENCE TO RELATED APPLICATIONS

This application claims priority to U.S. Provisional Application No. 62/916,086, titled "System and Method for Automating STIG Assessments and Mitigations", filed Oct. 16, 2019 and is incorporated herein by reference.

STATEMENT REGARDING FEDERALLY SPONSORED RESEARCH OR DEVELOPMENT

This invention was made with government support from Contract FA8652-19-P-HB08. The United States government has certain rights in the invention.

BACKGROUND

The Department of Defense's (DoD) warfighting and defense mission capability through DoD information networks are at constant risk of impairment or exploitation due to development/sustainment supply chain vulnerability of mission systems and their critical functions. Vulnerabilities within a system can make that system subject to sabotage or subversion by foreign intelligence, terrorists, or other hostile parties. Due to these risks it is essential that robust system engineering, supply chain risk management, security, cybersecurity, software, information assurance and information systems security engineering disciplines are utilized to determine and manage risk to the system integrity. Due to these risks DoD system or other organizations and companies must satisfy the same Information Assurance (IA) system integrity standards as outlined in the DoD Risk Management Framework (RMF), which is based closely on the National Institute of Standards and Technology (NIST) Special Publication 800-37 to manage the lifecycle cybersecurity risk. With RMF, the DoD goal to use technical capabilities to defense cybersecurity operations (DCO) is to implement a set of cybersecurity activities and internal defense measure to protect the DoD information network.

Security Technical Implementations Guides (STIGs) are NIST based Defense Information System Agency (DISA) security guideline standard(s) (SGS(s)) for assessing and hardening computer systems and networks against cybersecurity attacks. STIGs consist of security controls that are highly manual making system accreditation time and labor intensive. These guides, when implemented, enhance security for software, hardware, physical and logical architectures to further reduce vulnerabilities. STIGs are broken into two types 1) Automated—applied through use of automation tools like Global Policy Objects (GPO's) or scripts and 2) Manual—Must be addressed by the reviewer.

Application of DoD Information Assurance Certification and Accreditation Process (DIACAP) is mandated across all applicable systems. DIACAP utilizes DISA STIGs as formal standards to inform documentation and dictate general tasking and vulnerability mitigation for systems to achieve certification accreditation. While STIGs are necessary to ensure system integrity, the application of a STIG to a system is largely manual requiring at minimum a system administrator (SA), Information Technology (IT) or Information Assurance (IA) professional to manually read STIGs assessment or mitigation tasks to measure or mitigate, respectively, system vulnerabilities. High volumes of checks and mitigation tasks within a single STIG along with numerous STIGs applicable to a single system makes fully analyzing and mitigating vulnerabilities of a single system so labor and time intensive that accreditation standards were reduced to assessment and mitigation of only a small sample of STIGs controls on the highest severity to achieve certification and accreditation.

A need exists to automate more of these activities with reduced and or no human interaction for vulnerability assessment, analysis, management, information security continuous monitoring, cyber incident handling, malware protection, warning intelligence and user activity monitoring. The need applies to other Security Guideline Standards from other Security Standards Authorities specific for different industries like banking, healthcare and government records, for example.

BRIEF SUMMARY OF THE INVENTION

One embodiment of the present invention provides for a method for determining a point in time compliance status of a computer system with a security guideline standard (SGS). A SGS can help secure networks in the military, health care and financial systems for example. In one embodiment a computer system has a command line shell available, such as for example BASH or Powershell, through its native operating system. In this embodiment a compiler is not required to be installed on a target device to implement dynamic commands. Using a native command line shell means that there is already an available language that is readily available that can access the device's/machine's processes and file systems. Compiled languages have many issues in that the compiled code would need to be compiled before being sent over and if the target device/machine does not have the correct software to be able to execute the compiled code, then code does not get executed. Using a native command line shell, bypasses the limitation of not being able to install certain programs or being sure that certain programs are on the target device/machine to be able to successfully execute commands. The method comprises the steps of inputting into a host computer of the computer system a security package that represents a scripted security guideline standard (SGS) that is a non-text file and is encrypted data that provides instructions for an evaluation of a computer system's compliance with the SGS sometimes referred to as a security guideline standard set under consideration wherein the scripted SGS performs at least a portion of an automated evaluation of the compliance status of one or more devices and or components of the computer system under consideration when the encrypted scripted SGS is decrypted. The scripted SGS that is applicable for a selected device is selected and decrypted and a command query based upon the decrypted script is sent to the selected device of the computer system. Compliance status results for example in response to the command query based upon the decrypted script are sent from the selected device to the host computer and compiled in a database, for example a locally hosted database on the host computer. A report of the compliance is generated for a compliance status report of the selected device with the scripted SGS that is applicable. The report comprises for example one or more of the following condition codes: compliant, non-compliant, not applicable, manual, and manual with data as to compliance with the SGS under consideration. One or more or at least a portion of the condition codes are assembled into an output file formatted for at least partial determination of a compliance status of the computer system with the SGS that is under consideration. The output file can provide data suitable to generate a file in a user defined output such as one or more of the following: CKL file, CMRS data, or xml file but not limited thereto. In a further embodiment, a non-compliant condition on the selected device of the computing system (also referred to herein as a computer system) can be automatically remediated at the command of an authorized operator. Further, the remediation action is saved in the database of the host computer/machine to allow rollback of the remediation action at the discretion of the user to the pre-mediation state, for example. As referred to herein, a scripted SGS package includes the one or more (i.e. the plurality) of SGS provided by an SSA for a version released.

The computer system/computing system may comprise one or more computing devices such as a server. The server can include a processor (for example a CPU) and memory supporting the execution of the operating system and one or more remote components that communicate with the processor through a wired or wireless interface which may be secured or not. For example, the processor may be a central processing unit which may communicate with one or more remote capabilities, such as Kerebos, SSH, or WinRM. Remote capabilities are in one example a means to communicate under an authenticated account with another network connected computer through the network and operating the computer remotely as if the user was accessing the computer directly. Further, the computer system may comprise a network of computers/devices and a generated report file provides at least partial determination of the compliance status of one or more or all the network of computers/devices being assessed. The computer system may comprise an arrangement of multiple components or target device including at least several devices, from the group consisting of laptops, desktops, other portable devices, servers, and those associated with local area networks. The computer system may comprise one or more network devices such as a router, a switch, and a server. The computer system may communicate with multiple domains. The command query resulting from the selected targeted device can be returned to the host computer/machine via wired or wireless data transfer. In one embodiment, no files are sent to a selected target device for execution of scans, security assessments, remediations or reporting. In one embodiment the host computer/machine is the target device.

The SGS may include for example a software security guideline standard (STIG) under the control of the Department of Defense (DoD). In one embodiment of the present invention, the execution of the scripted SGS by the host computer generates data that is stored in the host computer database which can be used in real present time or at a later time to generate a report on demand. The vulnerability status of the selected target device of the computer system is determined from the assessment results stored in the host computer database and from an inventory scan of the computer system. The inventory scan is initiated automatically by the system or manually by the user. The inventory scan provides information as to one or more of the following: network connected computers, memory used, memory allocated, free memory, network information such as mac addresses, gateways and IP addresses, operating system, software installed, processor information.

Another embodiment of the present invention provides a computer system adapted to provide an indication of its compliance with a scripted Security Guideline Standard (SGS), the system comprising a host computer in communication with one or more network devices via a network, the host computer comprising a processor and non-transitory computer readable medium storing processing instructions for bidirectional network communication, wherein the processing instructions, when executed by the processor, cause the processor to:

input into the host computer a scripted SGS that is a non-text file and is encrypted data that provides instructions for an evaluation of a computer system's compliance with the SGS under consideration wherein the scripted SGS performs at least a portion of an automated evaluation of the compliance status of the computer system under consideration when decrypted;

decrypt the selected scripted SGS that is applicable for a selected network device;

send a command query from the decrypted script to the selected network device of the computer system;

compile in a database of the host computer results sent from the selected network device in response to the command query from the decrypted script that is applicable for the selected network device;

generate a report for the compliance of the selected network device with the scripted SGS that is applicable;

wherein the report comprises one or more of the following condition codes: compliant, non-compliant, not applicable, manual, and manual with data as to compliance with the scripted SGS under consideration; and assemble at least a portion of the condition codes into an output file formatted for at least partial determination of a compliance status of the computer system with the scripted SGS under consideration.

One aspect of one embodiment of the present invention provides a system and method to satisfy the goals of RMF mandated DCO with an automated system and method to perform one or more of the following: assessing, remediating, analyzing and reporting cybersecurity vulnerabilities in a computing system with a computing system as based on SGS provided by a Security Standard Authority (SSA) such as DISA STIGs while therefore retaining the agility of mission critical systems.

Another aspect of one embodiment of the present invention provides for automation of SGS assessments such as STIGs to free up professional resources formally dedicated to STIG assessments to more immediate and critical issues and system tasks.

Another aspect of one embodiment of the present invention provides for a data recording framework capability to assess and remediate cybersecurity vulnerabilities outlined by SGS of a Security Standard Authority (SSA) such as NIST standard DISA evaluations.

One aspect of the system provides for increased efficiency to apply STIGs (for example 1000+ formerly manual checks on a newly instantiated VLAN consisting of two Windows 2016 Servers and two Windows 10 workstations) automatically. Applying the same STIGs manually, in contrast with a competent SA or IA professional to assess each check takes about two minutes per check or about 30+ man-hours. Implementation of one embodiment of the present invention completed 30+ man-hours of effort in less than 3.5 minutes. Another aspect provides for a system that can significantly reduce IT and cybersecurity professional's workload from days to minutes.

The US Defense Department has declared cyberspace a new domain of warfare. With increasing application of software and technology military cybernetworks cybersecurity vulnerability surface area has also increased. Utilization of System will allow military operations to quickly assess and mitigate cybersecurity vulnerabilities before attackers can exploit vulnerabilities while maintaining operations.

Quick and accurate assessments and increased awareness of cybersecurity vulnerabilities enables the military to utilize the knowledge to plan and develop more secure mission critical systems, reduce cost of securing and maintaining current mission systems, and identify the most exposed components of systems most vulnerable to malicious attack from malicious actors. A system and method described herein is not limited to military applications as all businesses are vulnerable to cyber-crimes and would benefit from hardening their computer systems as discussed.

According to one embodiment users will access a package distribution server to download a package database also referred to herein as an encrypted script package or a scripted SGS and any periodic updates thereto and incorporate them in a system with the ability to access the SGS automated packages as required by the application. The system and method integrates the user's ability to provide assessment and mitigation capabilities within the security set assessment guidelines.

One aspect of the system provides an automated analysis, recording, mitigation and reporting system and method which utilizes security standards for example, STIGs, from DISA with minimal or no human intervention for the assessment.

Another aspect of an embodiment of the present invention provides for a variety of possible network topologies, operating systems, applications, and modes of operation including virtualization technologies and automation tools in which the system and method operates.

Another aspect of one embodiment of the present invention provides for a Package Database input to a host computer of a computing system to which a SGS is to evaluate cybersecurity vulnerability as compared to the SGS wherein a user can invoke/request a selected individual automated or manual scripted SGS which is downloaded to the host computer as encrypted in the Package Database and only decrypted right before the command is used locally or remotely to prevent third party tampering.

Another aspect of one embodiment of the present invention provides that no Comma-separated value (.csv) text file script with command line commands are sent to the target device for execution and generation of output results in the form of a report or otherwise but instead commands are sent by the host computer and results are sent back to the host computer, and saved in a result database. In one embodiment, no file is transmitted, generated, or removed from a target device in the computing system during the real time assessment for compliance status as compared to a selected SGS when the computing system includes a host computer in the network with the target device.

Another aspect of one embodiment of the present invention provides that the Package Database that resides on the host computer is not human readable or modifiable and the source of the command lines are centrally located on the host computer that hosts the application and no files are communicated from the host computer to a target device of the computing system to retrieve point in time compliance with the SGS such as execution of scans, security assessments, remediations, or reporting.

Another aspect of one embodiment of the present invention provides that one SGS can be selected from a plurality of others within the Package Database for dynamic assessment or remediation on an individual host computer or target device or a computing system without invoking the non-selected SGS of a particular SGS set per version.

Another aspect of one embodiment of the present invention provides that execution of an SGS is executed on a user determined schedule.

Another aspect of one embodiment of the present invention provides for the assessment of the processor and memory utilization of a target device to automatically adjust the execution of the automated assessments or remediations to reduce impact to the target device.

Another aspect of one embodiment of the present invention provides that a User can enter specific credentials for target machines if they do not match the login credentials and/or a user defined report can be generated using an xml template and/or the host computer input is an XCCDF file and can export a checklist (CKL) files.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 9 illustrates a screen with generated/updated records with up to date computer information according to one embodiment of the present invention.

FIG. 10 illustrates a specific device view according to one embodiment of the present invention.

FIG. 11 illustrates a specific device assessment result view according to one embodiment of the present invention.

DETAILED DESCRIPTION OF THE INVENTION

As used herein, the singular forms "a," "an" and "the" are intended to include the plural forms as well, unless the context clearly indicates otherwise. It will be further understood that the terms "comprises" and/or "comprising," when used in this specification, denote the presence of stated features, integers, steps, operations, elements, and/or components, but do not preclude the presence or addition of one or more other features, integers, steps, operations, elements, components, and/or groups thereof.

As used herein "operating system" is a program that runs on a computer and provides a software platform on which other programs can run.

As used herein "security guideline standard" (SGS) is a requirement(s) for the security relevant portion of the computing system as issued by a security standard authority (SSA).

As used herein a "SGS Package" is a scripted SGS that is encrypted and is sometimes referred to herein as a "Package Database" or "encrypted script package".

Figure 1:
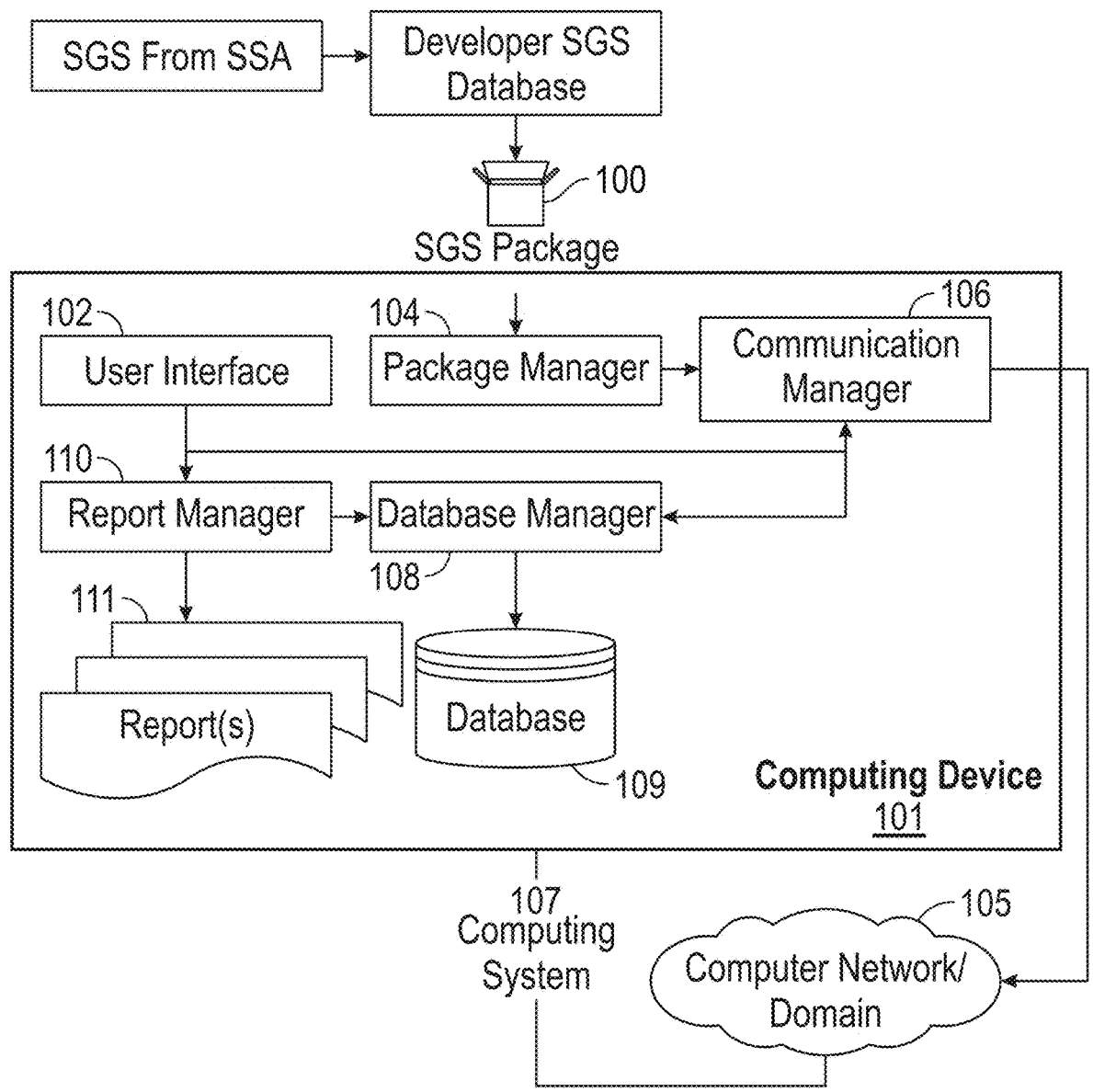
FIG. 1 illustrates a high-level flow chart for the processing of a SGS according to one embodiment of the present invention.

Referring now to FIG. 1, a high level flow chart for the processing of a SGS from a security standard authority (SSA), for example, STIG from DISA but not limited thereto as other guidelines exist such as HIPPA for health care, FFIEC for banking, and PCIDSS for commerce issued by other SSAs. SGS Package flow to a computing device is illustrated in the flow chart according to one embodiment of the present invention. An Encrypted Script Package or Package Database is created by scripting of a SGS such as STIG from DISA using, for example, Microsoft PowerShell scripting functionality as illustrated generically in FIG. 12 for SGS guidelines. The "script" implements the documented steps or assessment criteria in the SGS for example "DISA STIG" to create a scripted SGS. The steps within a script may implement assessment or mitigation criteria to automate individual security controls within an SGS guideline, for example STIG. The method as illustrated in FIG. 1 applies the automated portion of a SGS(s) in a consistent and repeatable manner per each computing system. Further, the method can automate the manual response portion of the SGS(s) to increase efficiency per system as an option.

Figure 12:
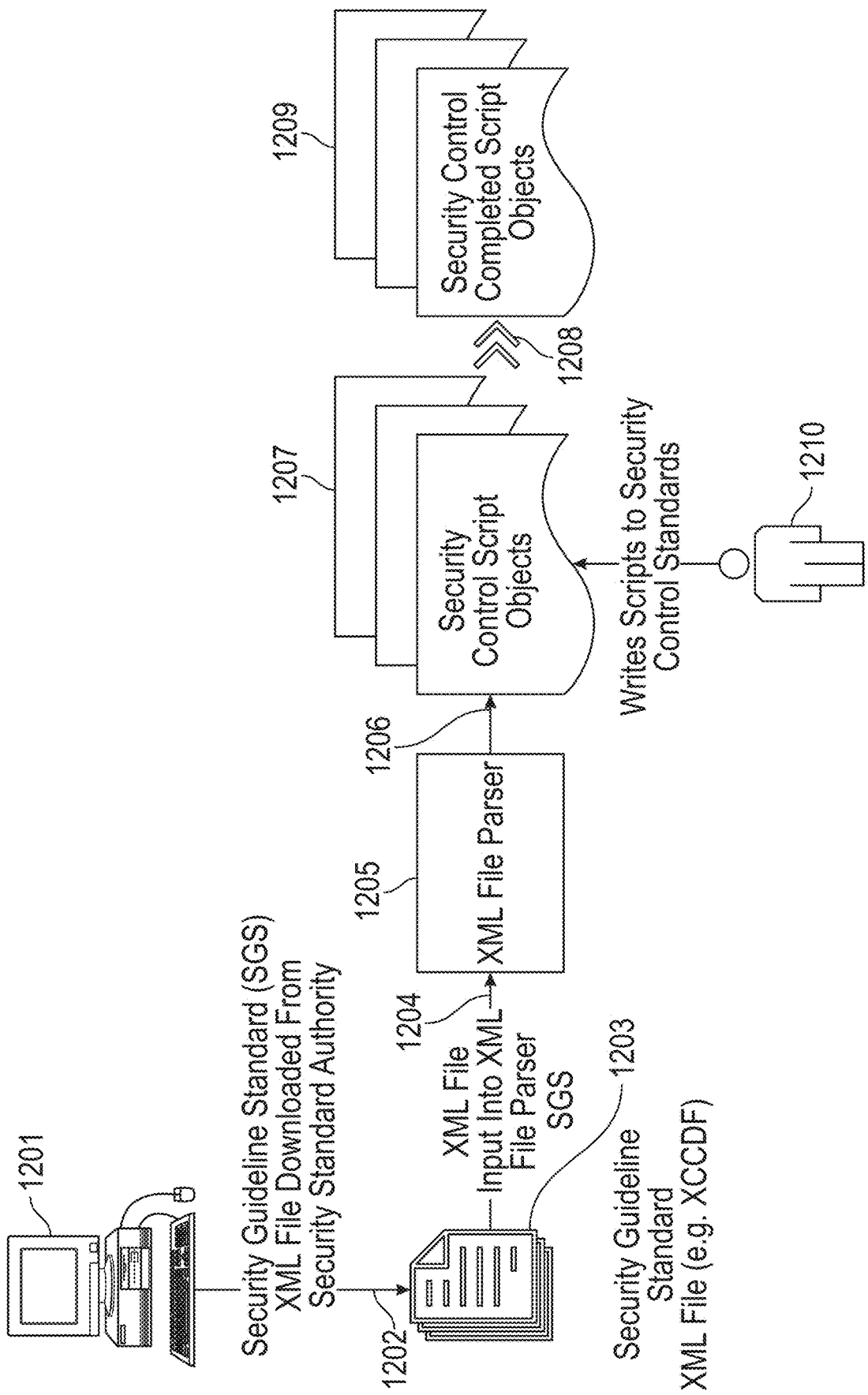
FIG. 12 illustrates a flow chart of SGS script creation according to one embodiment of the present invention.

Referring now to FIG. 12, creation of a security control completed script objects 1209 is illustrated according to one embodiment of the present invention. Security control completed script objects 1209 are generated from SGS files 1203 downloaded 1202 or otherwise input to a system from a security standard authority 1201. The SGS file is input 1204 into a file parser 1205. The file parser parses the SGS to a usable data format (ex. for Input: SGS XCCDF Format ie STIG for DISA provided STIGViewer and ingests XCCDF STIG XMLs typically utilized by DISA STIGViewer and parses XML into a scripted STIG database). A script developer 1210 interprets, writes, and tests scripts to adhere to security control standards from the SGS guidelines to produce security control script objects 1207 and 1209.

In one embodiment, each SGS produced by a SSA, for example each STIG produced by DISA, has multiple vulnerability checks. Each vulnerability has an associated mitigation action. In one embodiment, the script developer 1210 produces a script file for assessments and/or a script file for mitigations for each vulnerability. Each script file contains the scripted steps required to perform the assessment/mitigation as specified in the original SGS, for example a DISA STIG. For example, a security control assessment may specify for the operator to check permissions on a file. A script developer would create a script to automate checking the permissions on the file.

For example, DISA STIGs are interpreted into discrete scripts to satisfy outlined security requirements. Testing and verification ensure a variety of conditions and system configurations do not result in false positive or negatives and to ensure data integrity in various potential network topologies. Each security control of automated STIGs can be manually interpreted and the scripts written can be tested against a variety of possible system configurations. In addition, with each subsequent DISA STIG Library Compilation (DSLC) release, some security control assessment and/or mitigation criteria are updated for assessments and mitigations previously automated, therefore some scripts need to be reevaluated and tested.

Figure 13:
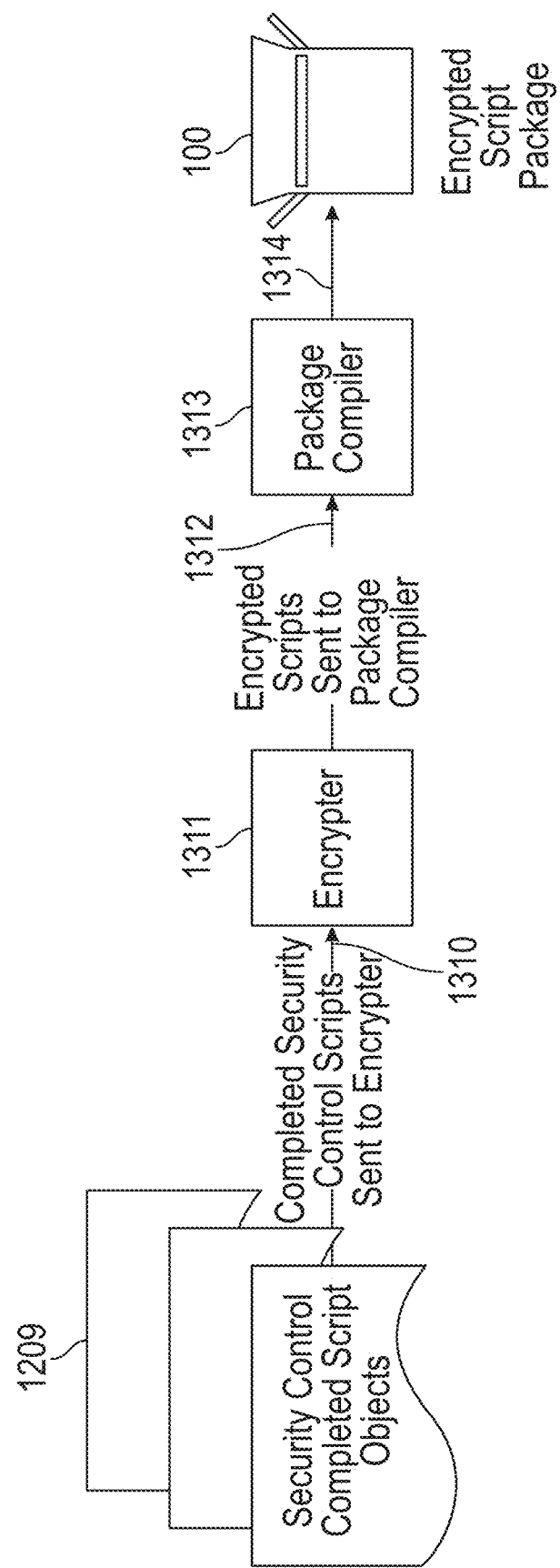
FIG. 13 illustrates a flow chart of SGS script creation according to one embodiment of the present invention.

Once security control assessment and remediation scripts each have qualified automation routines, the scripts that implement the SGS for example STIGs, must be compiled and encoded and/or encrypted into a loadable package for distribution and application by an end user. Referring now to FIG. 13, a security control completed script object 1209 is transmitted 1310 to an encrypter 1311 to produce encrypted scripts which are sent 1312 to a package compiler 1313. The package compiler 1313 produces 1314 an encrypted script package, also known as a SGS Package or Package Database 100.

Referring again to FIG. 1, one embodiment of the present invention provides an encrypted script package which contains the scripts which implement a SGS, for example, located on a host computer/computing device 101, and a locally hosted database (109 from FIG. 1, 415 from FIG. 4, 108 from FIG. 6) installed on the host computer which contains system configurations, assessment and mitigation results, and default responses. Typically, default responses are used when a particular SGS assessment applies to a high-level system configuration requirement such as documentation compliance, documentation cross checks, physical security status, waivers, non-compliance justifications, or an assessment response which is not able to be automated. The locally hosted database can have one or more of the following features: is centralized and accessible for periodic review and maintained for consistency of responses, eliminates redundancy, avoids reliance on possible multiple conflicting data sources, and retains information and continuity when information sources or personal are no longer available. The locally hosted database provides a means to collate automated assessment results, automated mitigation results, and custom system default responses for a particular encrypted script package also sometimes referred to herein as a Package Database or SGS Package. Vulnerability results, default or automated responses are saved to the locally hosted database and can be used to create a checklist file in any format for example DISA format, viewable and ingestible by DISA STIGViewer when the SGS is STIG.

The STIGViewer GUI provided by DISA to read manual assessment and mitigation actions for vulnerabilities per each STIG saves responses to each action and produces a checklist typically converted into CRMS file but does not support automation. This tool requires Java, limiting its use on systems that have not purchased Java license required to run the tool. This may not be practical on systems that prohibit Java, do not have internet access, and are not updated regularly with new versions of the tools. The system and method of an embodiment of the present invention is compatible with a device that would need to read/write a checklist file, for example on a host machine also referred to herein as a host computer.

Figure 2:
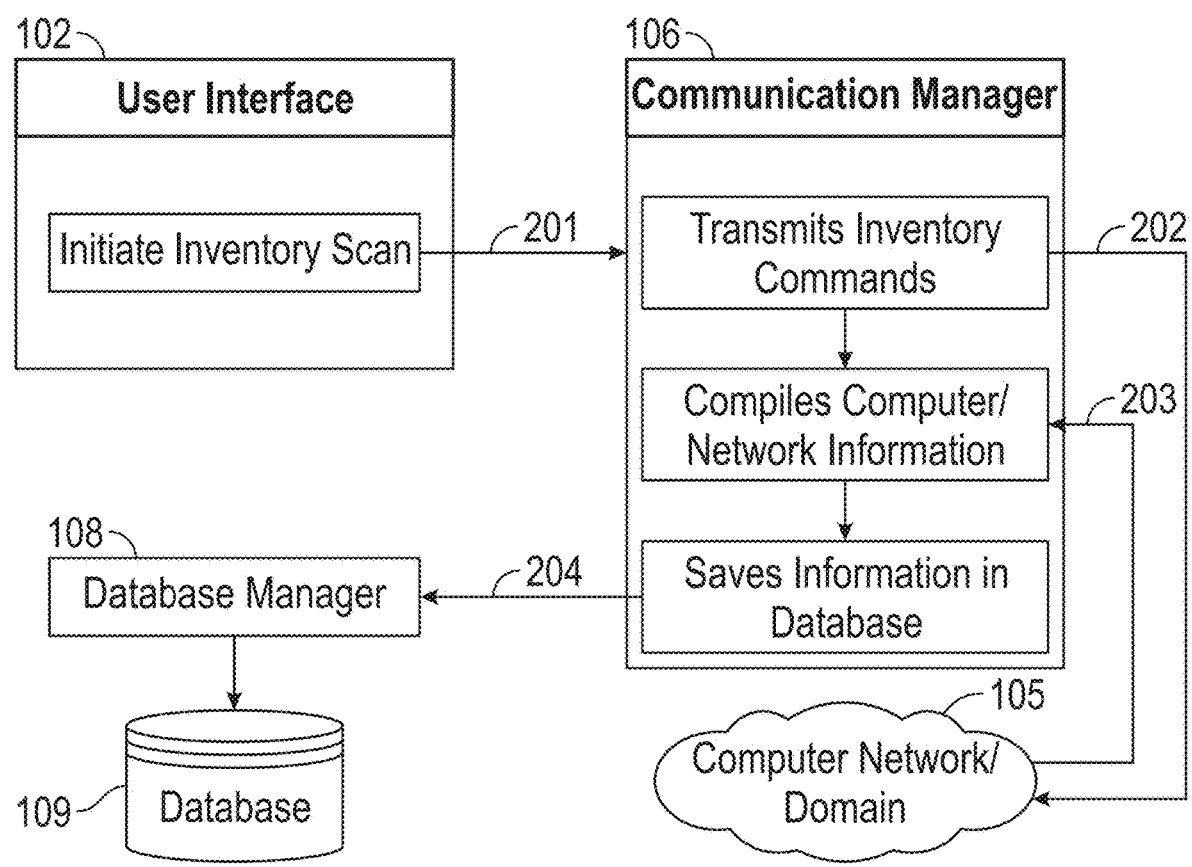
FIG. 2 illustrates an architecture for one embodiment of the system and method.

Referring now to FIGS. 1-2, a flow chart for one embodiment of the system and method is illustrated. The system comprises one or more of a Communication Manager 106; Database Manager, 108, End User GUI Interface 102, Package Manager 104, and Report Manager 110. A user initiates an inventory scan 201 and the Communication Manager 106 communicates/transmits 202 inventory commands to the computer network/domain 105 and compiles computer network information returned 203 from the computer network/domain which information is transmitted 204 to the Database Manager 108 and stored in a Database 109.

Figure 3:
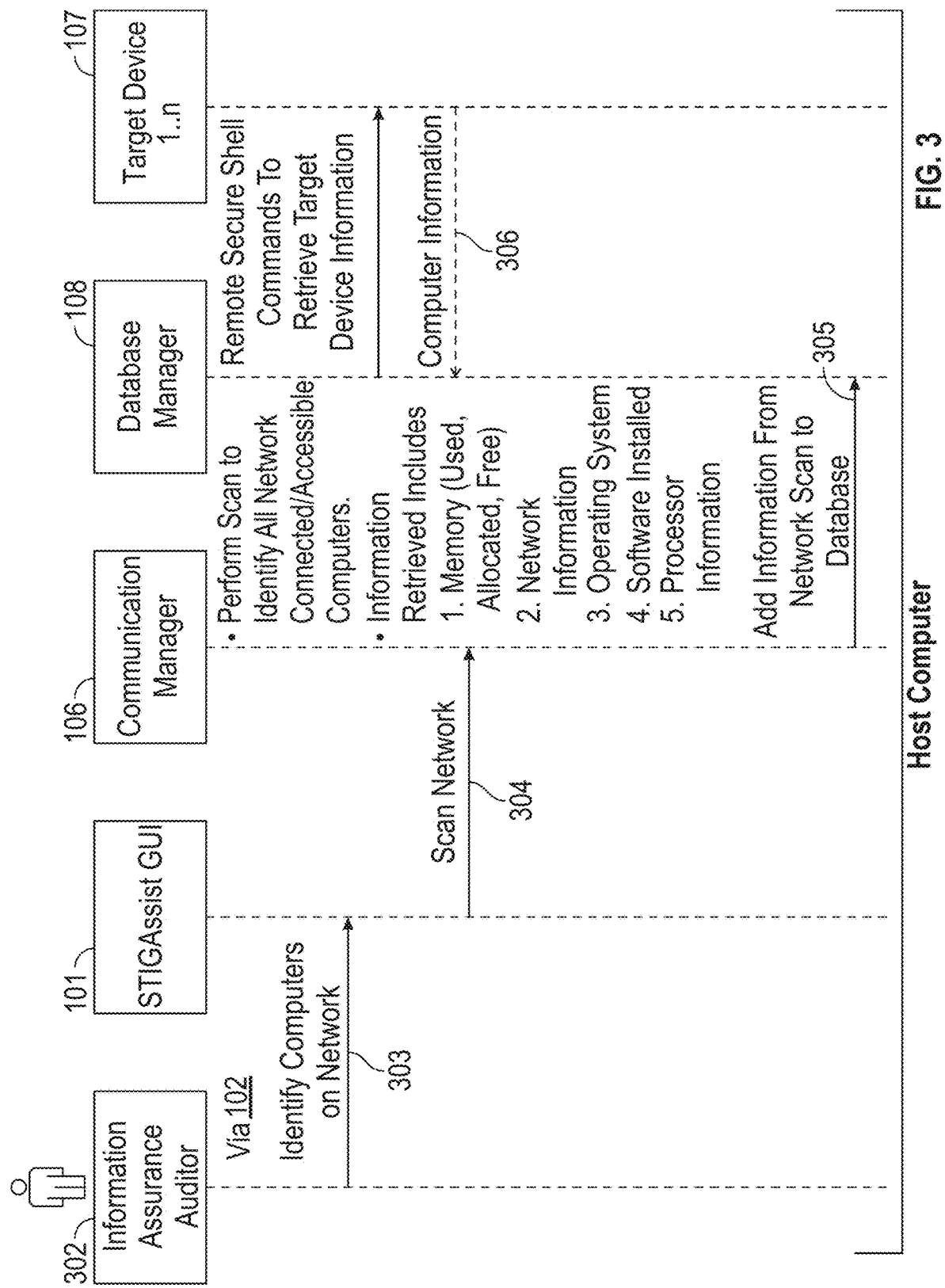
FIG. 3 illustrates one embodiment of the present invention wherein a Communication Manager is used to transmit commands and receive information through establishing secure shell connection to target network devices within an operating system.

Referring now to FIG. 3, in one embodiment, the Communication Manager 106 transmits 305 commands and receives 304 information by establishing one or more secure shell connections 306, to target devices 301, within a computer system. Once the user identifies the domain controller of a LAN system and provides appropriate administration credentials of the domain, the Communication Manager 106 leverages the domain controller information to compile a list of accessible domain computers and devices. The domain administrative credentials are used to test computer/device connectivity and availability. If the computer is accessible, credentials are used to send remote commands to determine basic information of the computer such as operating system, architecture, memory allocation, software installed, number and type of processors/CPUs, and number of hard drives, external devices but not limited thereto. The information obtained is returned from the target device and sent to a Database Manager 108 to be stored in a locally hosted database 109. The database information 305 allows a user to determine the devices in a network, the status of each device, which SGS, for example STIGs are applicable for which device in the network and which SGS (for example STIG) to run on each device.

Multiple modes of operation accommodate a working systems target device being assessed limitation on memory and CPU. The system and method of an embodiment of the present invention can connect to an operating system in three ways. Localhost for standalone systems, direct host-to-target for host operating within domain and double-hop host-to-Domain Controller-to-target for host operating outside domain. In one embodiment, the Communication Manager 106 is incorporated in End User GUI interface also known as the STIGASSIST GUI as it requires communicating to target computers to function properly.

In one embodiment, the system and method of one embodiment of the present invention can operate on a Virtual Machine (VM) environment, for example, a VM environment that comprises a Domain Controller (MS Server 2016), a server (MS Server 2016), and 2 Windows 10 workstations. All are virtual devices and instantiated on VMWare.

In one embodiment, the Database Manager 108 consists of two components: a locally hosted SQL database for storing SGS results 109 and interface functions to write and retrieve data to/from the locally hosted database. A system application within the computing system, for example on the host machine or target device is able to access a locally hosted SQL database 109. Data within the database is encrypted (when deployed) to protect from tampering and manipulation of encrypted script package results, for example STIG results. For example, the Database Manager 108 controls the locally hosted database that holds the results of the scans and the computer system inventory.

Figure 4:
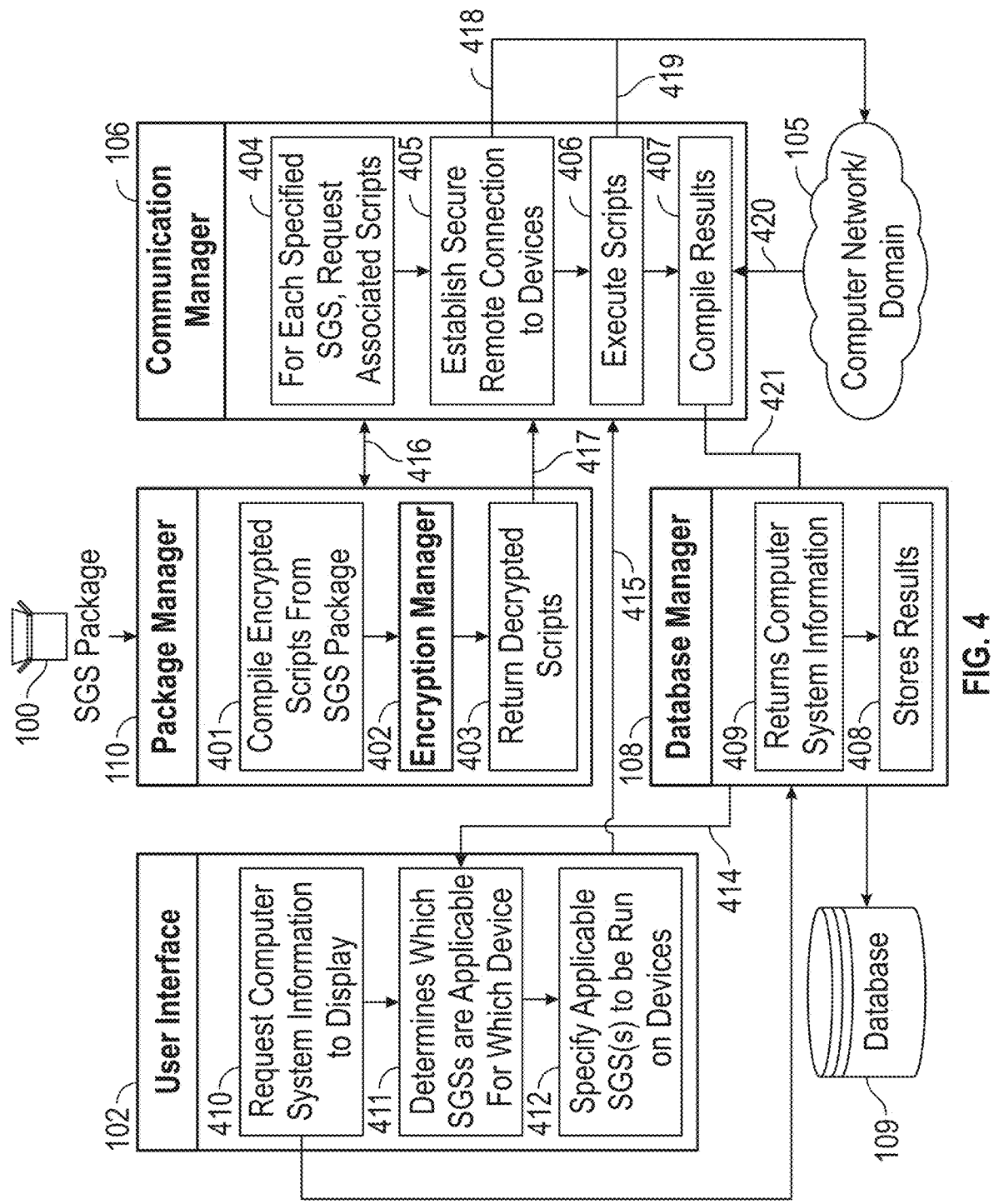
FIG. 4 illustrates a Package Manager that provides an interface for retrieving SGS related information (such as scripts for running the implemented SGS(s), security controls for each implemented SGS, Check and Set Text for each security control, etc.) stored in the Package Database on the host computer according to one embodiment of the present invention.

Referring now to FIG. 4, the User Interface 102 allows a user to request computer system information to display 410 and transmits 1 the information to the Database Manager 108. The Computer system information 409 is returned 414 to the User Interface 102 so that a user/the system can determine which assessments from an SGS based encrypted scripted package (or package database) are applicable for each device of interest 411 for which the SGS is matched. Each SGS, for example STIG, that is applicable for each target computer/device 412 is transmitted 415 to the Communication Manager 106. The Package Manager 110 provides an interface for retrieving and/or transmitting 416 STIG related information (such as scripts for running the implemented STIGs, security controls for each implemented STIG, Check and Set Text for each security control, etc.) stored in the Package Database. on the host machine according to one embodiment of the present invention. There can be several different Package Database versions stored (each quarterly STIG release from DISA may create a new Encrypted script package), and the Package Manager 110 is able to retrieve 416 information from the correct version.

The Package Manager 110 retrieves encrypted scripts 401 from the Package Database 100. For each specified SGS assessment or mitigation, associated scripts are requested 404 by the Communication Manager 106. The Encryption Manager 402 returns 417 the decrypted script 403 to the Communication Manager 417 and the Communication Manager 106 establishes 418 a secure remote connection 405 to the device on the network 105 to which the STIG applies and the script is executed 406 to perform an assessment or mitigation on 41 the targeted device. Results from the targeted device related to the script are returned 420 to the Communication Manager 106 and are compiled 407 and sent 421 to the Database Manager 108 where results are stored 408 in the locally hosted database 109. The decrypted commands from the script are sent to the target device and the results are compiled and stored in the locally hosted database.

Figure 5:
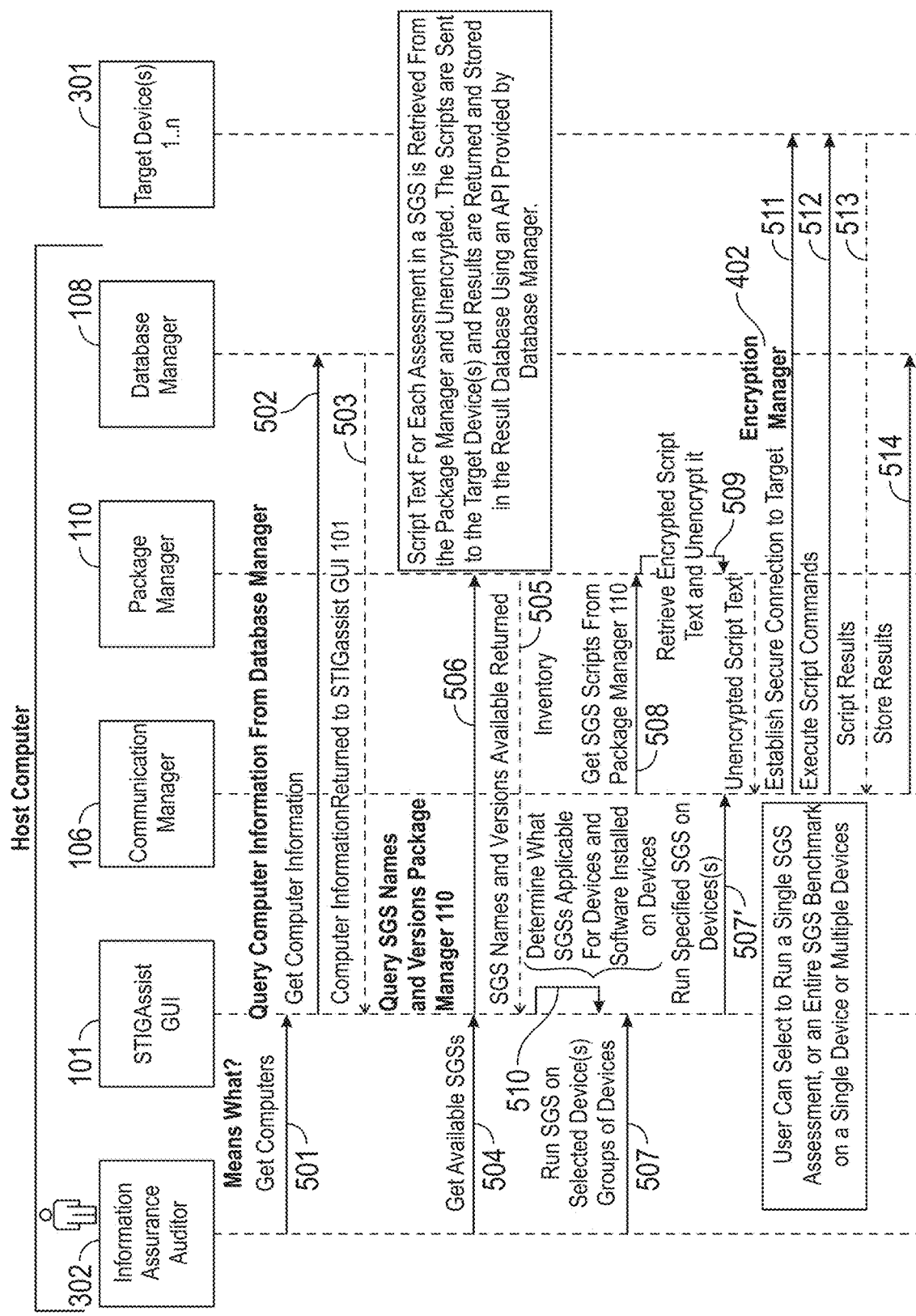
FIG. 5 illustrates a flow chart according to one embodiment of the present invention with the steps of the method as run on a system as described herein.

Referring now to FIG. 5, a flow chart illustrates the steps of the method as run on a computing system as described herein according to one embodiment of the present invention. Information Assurance Auditor 302 via a STIGAssist GUI 101 requests computer information 501. A query 502 as to the computer information is transmitted to the Database Manager 108. The Database Manager 108 returns computer information 503 to the STIGAssist GUI 101. The Information Assurance Auditor 302 can also request available SGS (s) 504 via a STIGAssist GUI 101. A query regarding SGS names and versions 506 is sent to the Package Manager 110. The Package Manager 110 returns 505 SGS names and versions. The STIGAssist GUI 101 determines what SGS is applicable for devices and software installed on target devices 506. The Information Assurance Auditor 302 selects the SGS to run on a selected device or group of devices 507 and this information is transmitted to the Communication Manager 106. The Communication Manager 106 transmits to the Package Manager 110 the SGS scripts 508 to retrieve. The designated encrypted script text is retrieved and unencrypted 509 and returned 510 to the Communication Manager 106. The Communication Manager 106 establishes 511 a secure connection with the target device 301 and executes script commands 512. The Script results 513 are returned to the Communication Manager 106 from the target device 301. The script results are transmitted to the Database Manager 108 for storage 514.

Figure 6:
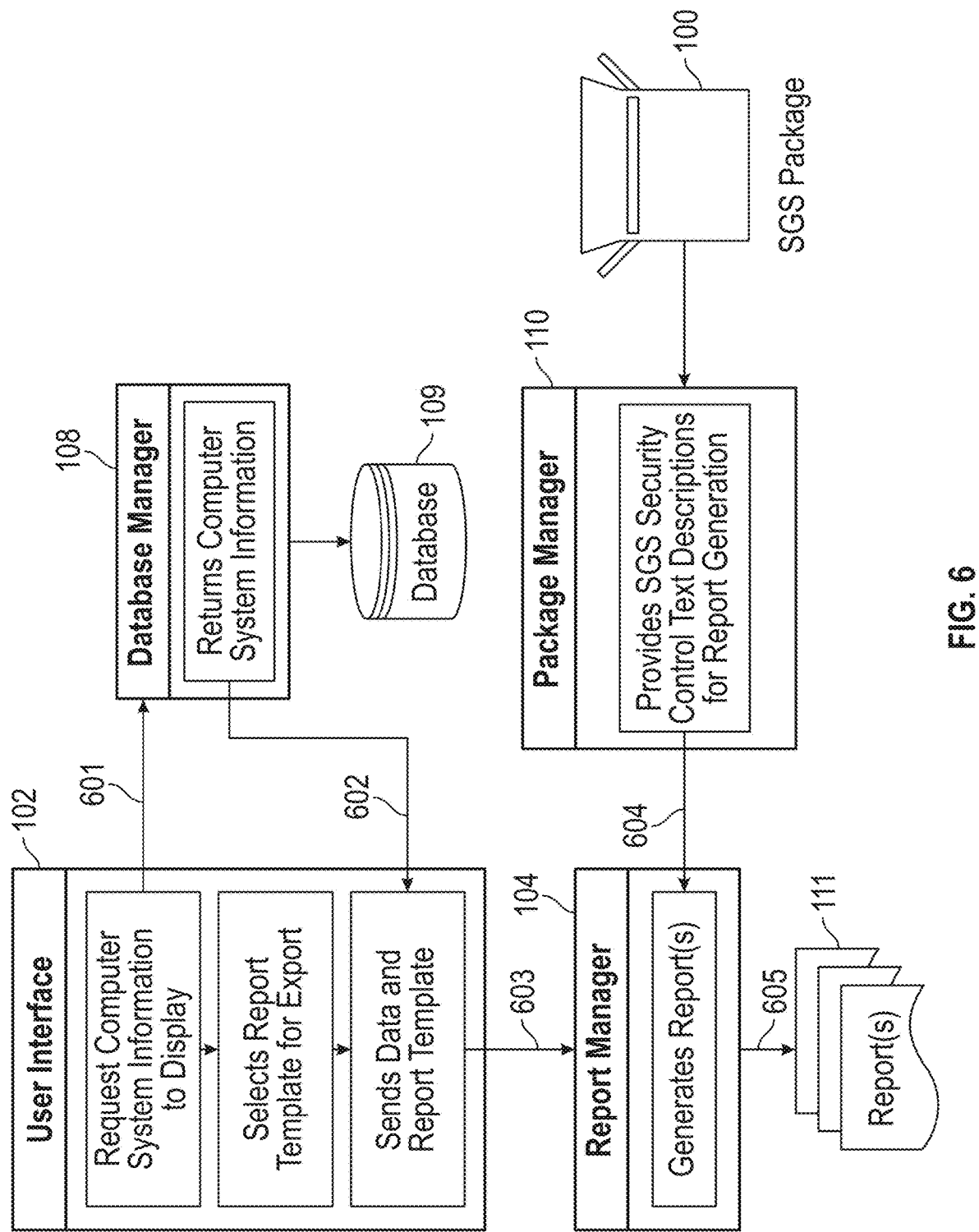
FIG. 6, a SGS reporting sequence is illustrated, according to one embodiment of the present invention.

Referring now to FIG. 6, a SGS (for example STIG) reporting sequence is illustrated, according to one embodiment of the present invention. A request for computer system information to display is transmitted 601 to a Database Manager 108 from the User interface 102. Computer system information is returned 602 to the User Interface 102. The User Interface selects the report template for export and sends data and report template 603 to the Report Manager 104. The Report Manager 104 generates a report and either displays the report 605 or saves it. The Database Manager

108 also transmits the computer system information to a locally hosted database 109. Package Database 100 is input to the Package Manager 110. The SGS text descriptions of the STIG is provided 604 to the Report Manager 104 from the Package Manager 110 for report generation.

Figure 7:
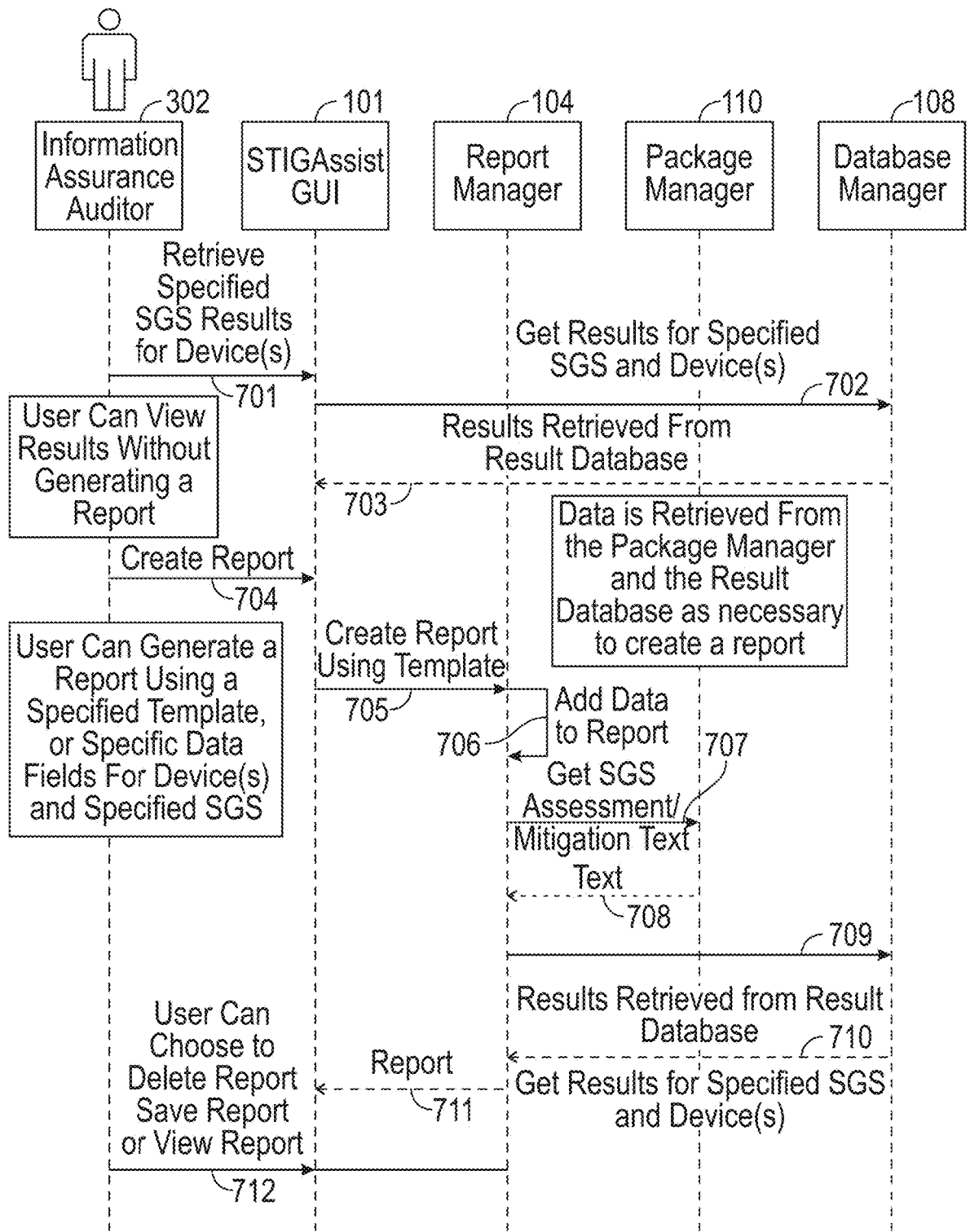
FIG. 7 illustrates a reporting sequence according to one embodiment of the present invention.

Referring now to FIG. 7, a reporting sequence is illustrated, according to one embodiment of the present invention. Information Assurance Auditor 302 initiates retrieving 701 specified SGS results for devices. A query 702 is sent to the Database Manager 108 to get results for the specified SGS(s) for a targeted device. The results for specified devices are returned 703 from the Database Manager to be acted upon by the Information Assurance Auditor 302. The results may be displayed by the STIG Assist GUI without generating a report for review. The Information Assurance Auditor 302 initiates creating 704 of report and/or create a report via a template 705. Data is added to the report 706 from the Report Manager 104. An SGS assessment request is transmitted 707 to the Package Manager 110 for the devices specified. The request may include mitigation text. Data is retrieved from the Package Manager 110 and the locally hosted database (may want to change result database to locally hosted in drawing) associated with the Database Manager 108 as necessary to create a report. Results for specified SGS and devices are transmitted 710 to the Report Manager 104 and a report 711 is transmitted to STIGAssist GUI 101. The Information Assurance Auditor 302 can choose to save report, delete report or view report 712.

Figure 8:
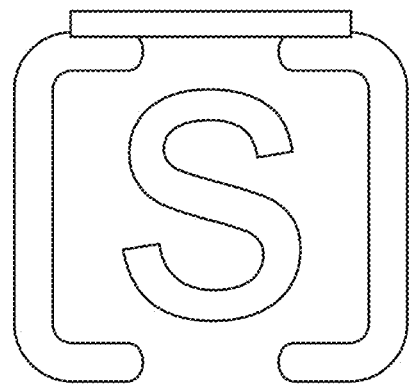
FIG. 8 illustrates an admin screen for use by a local system administrator for one a prototype of the system was created.

Referring now to FIG. 8, a prototype of the system is illustrated with an admin screen for use by a local system administrator to enter in appropriate credentials for target system and domain access according to one embodiment of the present invention. If required, system administrator will initiate application to scan designated system for accessible physical or virtual computers on a network/domain.

One embodiment of the present invention provides a screen view of login to initiate the system as described herein. Upon start of an application, the system and method accepts user administrative credentials as illustrated according to one embodiment of the present invention. For example, once logged in, user can specify domain controller of VLAN domain the user desires to scan for devices. Application utilizes initial credentials to access domain controller if domain is turned on or domain is accessible from the host computer. Once the domain controller is accessed, the registered computers on the domain are cataloged and credentials are used to gain access to extract inventory information. The results of the device scan are presented to the user and are made accessible for access for the other components of the system and application while the credentials are valid, and the target/host devices remain accessible on the domain.

Referring now to FIG. 9, the application will generate/update records with up to date computer information according to one embodiment of the present invention. Information that is provided may include, operating system, network information such as mac addresses, IP Addresses, Gateway, and installed software. From this information, the System Administrator can select which SGS to apply toward the system. Based upon the records gathered by the application, the application will apply relevant SGSs to network/domain devices. System administrator can select a specific network domain device record in application and run all device relevant SGSs. Application compiles results from SGS assessment into reviewable report.

Referring now to FIG. 9 and FIG. 10, selecting each device in the device page 901 with the inventory tab selected presents in-depth information of the selected machine in the network such as: Operating System, Architecture, Roles, CPU statistics, Memory statistics, Network information. Selecting each device in the device page 1001, with the assessment tab selected, presents all assessment run records of applicable SGS(s) to be viewed. Data is presentable and exportable in user specified formats. Further, users can create, save and modify computer or domain specific preferences such as automated desired remediation action, saved responses to reviewable data, or waivers for known non-compliant security controls.

In one embodiment of the present invention, an End User GUI has been developed to save results of assessments and outcomes of remediation to a local database. The results can be compiled into a report with DISA, ACAS, eMASS desired outputs. These outputs would allow IA certifying officials to quickly ingest the information and report it with a great reduction in man-hour requirements for each SGS.

An applicable SGSs based on the system hardware and applications are selectable by the system automatically or a user such as an IA or SA professional who can automate system assessment scans and remediations. If certain security controls result in negative impacts to mission critical functions and have been granted government waivers, these security control remediations can be turned off with and the setting saved with the waiver justification which is then passed on to assessment reports to maintain continuity.

Referring now to FIG. 10, a specific device view is illustrated 1001 according to one embodiment of the present invention. Selecting each device in the device page with the inventory tab selected presents in-depth information of the machine/device such as: Operating System, Architecture, Roles, CPU statistics, Memory statistics and Network information. Selecting each device in the device page, with the assessment tab selected, presents all assessment run records of applicable SGS(s) to be viewed. Users will have the ability to create, save and modify computer or domain specific preferences such as automated desired remediation action, saved responses to reviewable data, or waivers for known non-compliant security controls.

Referring now to FIG. 11, a specific device assessment result view is illustrated 1101 according to one embodiment of the present invention. System administrator, based on supplied results, will review possible noncompliance findings, select which noncompliance findings to automatically mitigate, enter in justifications for no mitigation action or manually determine compliance status. System administrator can save responses, desired security control configurations, and actions for automatic application in future scans and reports.

Referring now to FIG. 12-13, SGS script creation is illustrated according to one embodiment of the present invention. A SGS xml file is downloaded from a security standard authority 1201 to a processor of a computing device where a script developer 1210 (a person or an automated algorithm) writes a script to security control standards after the xml file is input into an XML, file parser 1205. Security control completed script objects 1209 are then transmitted 1310 to an encrypter 1311 to be encrypted by an encrypting module and the encrypted scripts 1312 are sent to a Package Compiler 1313 to produce an encrypted script package (Package Database) 100 to be sent to a user/subscriber host computer.

Further the steps of each module detailed herein may be embodied on a computer readable storage medium storing a plurality of instructions which when executed by a processor of a network apparatus causes the processor to perform operations, the operations comprising:

inputting into a host computer of the computer/network system a security package that represents a scripted security guideline standard (SGS) that is non-text file and is encrypted data that provides instructions for an evaluation of a computer system's compliance with the SGS under consideration wherein the scripted SGS performs at least a portion of an automated evaluation of the compliance status of the computer system under consideration when decrypted;

decrypting the selected scripted SGS that is applicable for a selected device;

sending a command query from the decrypted script to the selected device of the computer system;

compiling in a database of the host computer results sent from the selected device in response to the command query from the decrypted script that is applicable for the selected device;

generating a report for the compliance of the selected device with the scripted SGS that is applicable;

wherein the report comprises one or more of the following condition codes: compliant, non-compliant, not applicable, manual, and manual with data as to compliance with the SGS under consideration; and assembling at least a portion of the condition codes into an output file formatted for at least partial determination of a compliance status of the computer system with the scripted SGS under consideration.

Another embodiment of the present invention provides for a network apparatus comprising: a processor and non-transitory computer readable medium storing processing instructions for bidirectional network communication, wherein the processing instructions, when executed by the processor, cause the processor to:

input into a host computer of the computer system a security package (Package Database) that represents a scripted SGS that is a non-text file and is encrypted data that provides instructions for an evaluation of a computer system's compliance with the SGS under consideration wherein the scripted SGS performs at least a portion of an automated evaluation of the compliance status of the computer system under consideration when decrypted;

decrypt the selected scripted SGS that is applicable for a selected device;

send a command query from the decrypted script to the selected device of the computer system;

compile in a database of the host computer results sent from the selected device in response to the command query from the decrypted script that is applicable for the selected device;

generate a report for the compliance of the selected device with the scripted SGS that is applicable;

wherein the report comprises one or more of the following condition codes: compliant, non-compliant, not applicable, manual, and manual with data as to compliance with the scripted SGS under consideration; and assemble at least a portion of the condition codes into an output file formatted for at least partial determination of a compliance status of the computer system with the scripted SGS under consideration.

The processor executing the computer readable or software instructions relating to the above described method can be perceived as a programmed processor or a specialized processor. As such, the instructions as described herein (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

Virtualization compatibility with virtualization products and frameworks will be added into System to provide the necessary interface to complete virtualization product STIGs. One embodiment of the present invention utilizes VMWare for additional virtualized systems but not limited thereto.

In one embodiment, automation scripts will provide protection from tampering and misuse. Package and locally hosted databases can be encrypted to prevent malicious actors from modifying the locally hosted database to produce false results, modifying the script packages to provide automated incorrect results, to cause scripts to perform undesired operations on a system, or pirating our package scripts without a valid license. Only the application with valid keys can decrypt results or script packages for use.

End users need the ability to use system assessment data to produce reports and documentation in a variety of forms. In one embodiment, the system and method will convert the recorded data into end user desired reports.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device. With specific reference to a computer readable storage medium, it is to be understood that a computer readable storage medium excludes transitory media, such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied in a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object-oriented programming language and conventional procedural programming languages. The program code may execute entirely on the user's host computer, partly on the user's host computer, as a stand-alone software package, or entirely on the remote computer In the latter scenario, the remote computer may be connected to the user's host computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatuses (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other device to cause a series of operational steps to be performed on the computer, other programmable apparatus or other device to produce a computer implemented process such that the instructions which execute on the computer or other programmable apparatus provide processes for implementing the functions/acts specified in the flowcharts and/or block diagram block or blocks.

Finally, the terminology used herein is for the purpose of describing particular embodiments only and is not intended to be limiting of the invention.

The corresponding structures, materials, acts, and equivalents of all means or step-plus-function elements in the claims below are intended to include any structure, material, or act for performing the function in combination with other claimed elements as specifically noted. The depiction of the present invention has been offered for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention in various embodiments with various modifications as are suited to the particular use contemplated. All references and disclosures described herein are incorporated by reference for all purposes.

What is claimed is:

1. A method for determining a point in time compliance status of a computing system with a security guideline standard (SGS) wherein the computing system has a command line shell available through a native operating system, the method comprising:

inputting into a host computer of the computing system a SGS package that represents a scripted SGS that is a non-text file and is encrypted that provides instructions for an evaluation of a computing system's compliance with the SGS under consideration wherein the SGS package performs at least a portion of an automated evaluation of a compliance status at the point in time of the computing system under consideration when the SGS package is decrypted by the computing system;

decrypting the selected SGS package that is applicable for a selected device of the computing system;

sending a command query from the decrypted SGS package to the selected device of the computer system;

compiling in a locally hosted database of the host computer compliance results sent from the selected device of the computing system in response to the command query from the decrypted SGS package that is applicable for the selected device;

generating a report for the compliance results of the selected device with the SGS package that is applicable;

wherein the report comprises one or more of the following compliance results condition codes: compliant, non-compliant, not applicable, manual, and manual with data as to compliance with the SGS package under consideration; and assembling at least a portion of the condition codes into an output file formatted for at least partial determination of a compliance status of the computing system with the SGS package under consideration.

2. The method of claim 1 wherein the computing system comprises a central processing unit of the host computer and one or more remote devices that communicate with the central processing unit through a wired or wireless interface.

3. The method of claim 2 wherein the central processing unit communicates with one or more remote capabilities.

4. The method of claim 1 wherein the output file provides data suitable to generate a file in a user defined output.

5. The method of claim 4 wherein the user defined output file is selected from CKL file, CMRS data, and xml file.

6. The method of claim 1 wherein the computing system comprises a network of computers and the output file provides an at least partial determination of the compliance status of the network of computers.

7. The method of claim 6 wherein the computing system comprises an arrangement of multiple devices including at least several devices from the group of laptops, desktops, other portable devices, servers, routers, switches and that associated with domain sites.

8. The method of claim 6 wherein the computing system comprises multiple servers.

9. The method of claim 7 wherein the computing system communicates with one or more domains.

10. The method of claim 1 wherein the SGS package comprises a software security implementation guideline (STIG) under the control of the Department of Defense (DoD) or Center for Internet Security (CIS) benchmarks.

11. The method of claim 1 wherein the command query results from the target device are returned to the host computer via wired or wireless data transfer.

12. The method of claim 1 wherein execution of the SGS package generates data that is stored in the host computer local database which can be used at a later time to generate the report on demand.

13. The method of claim 1 wherein no files are sent to the selected device for execution of scans, security assessments, remediations or reporting.

14. The method of claim 1 further comprising automatically remediating a non-compliant condition on the selected device.

15. The method of claim 14 wherein the remediation action is saved in the local database of the host computer to allow rollback of the remediation action at the discretion of the user.

16. The method of claim 14 wherein the status of the selected device of the computing system in the locally hosted database results from an inventory scan of the computing system or the selected device of the computing system.

17. The method of claim 16 wherein the inventory scan is initiated automatically or by the user.

18. The method of claim 17 wherein the inventory scan provides information as to one or more of the following: network connected computers, network accessible computers, memory used, memory allocated, free memory, network information, operating system, software installed, and processor information.

19. The method of claim 1 wherein the host computer is the selected device.

20. A computer system adapted to provide an indication of its compliance with a scripted Security Guideline Standard (SGS), the system comprising:

a host computer in communication with one or more network devices via a network, the host computer comprising:

a processor and non-transitory computer readable medium storing processing instructions for bidirectional network communication, wherein the processing instructions, when executed by the processor, cause the processor to:

input into the host computer a scripted SGS that is a non-text file and is encrypted data that provides instructions for an evaluation of a computer system's compliance with the SGS under consideration wherein the scripted SGS performs at least a portion of an automated evaluation of the compliance status of the computer system under consideration when decrypted;

decrypt the selected scripted SGS that is applicable for a selected network device;

send a command query from the decrypted script to the selected network device of the computer system;

compile in a database of the host computer results sent from the selected network device in response to the command query from the decrypted script that is applicable for the selected network device;

generate a report for the compliance of the selected network device with the scripted SGS that is applicable;

wherein the report comprises one or more of the following condition codes:

compliant, non-compliant, not applicable, manual, and manual with data as to compliance with the scripted SGS under consideration; and assemble at least a portion of the condition codes into an output file formatted for at least partial determination of a compliance status of the computer system with the scripted SGS under consideration.

* * * * *